United States Patent
Jee

(10) Patent No.: US 11,572,115 B2
(45) Date of Patent: Feb. 7, 2023

(54) TREAD PATTERN

(71) Applicant: SRJ, Inc., Schaumburg, IL (US)

(72) Inventor: Woo Young Jee, Inverness, IL (US)

(73) Assignee: SRJ, Inc., Schaumburg, IL (US)

( * ) Notice: Subject to any disclaimer, the term of this patent is extended or adjusted under 35 U.S.C. 154(b) by 843 days.

(21) Appl. No.: 16/514,030

(22) Filed: Jul. 17, 2019

(65) Prior Publication Data

US 2021/0016847 A1 Jan. 21, 2021

(51) Int. Cl.
*B62D 55/24* (2006.01)
*B62D 55/26* (2006.01)
*B62D 55/125* (2006.01)

(52) U.S. Cl.
CPC ........... *B62D 55/244* (2013.01); *B62D 55/26* (2013.01); *B62D 55/125* (2013.01)

(58) Field of Classification Search
CPC ...... B62D 55/24; B62D 55/244; B62D 55/26; B62D 55/125
See application file for complete search history.

(56) References Cited

U.S. PATENT DOCUMENTS

| | | | | |
|---|---|---|---|---|
| 2,713,521 A | * | 7/1955 | Curtis | B62D 55/24 |
| | | | | 305/34 |
| 6,170,925 B1 | | 1/2001 | Ono | |
| 6,179,027 B1 | | 1/2001 | Shimizu | |
| 6,290,009 B1 | * | 9/2001 | Kondo | B62D 55/253 |
| | | | | 180/9.1 |
| 6,422,666 B2 | * | 7/2002 | Choi | B62D 55/24 |
| | | | | 305/165 |
| 6,652,044 B1 | | 11/2003 | Katoh et al. | |
| 7,533,945 B2 | | 5/2009 | Jee et al. | |
| 7,618,102 B2 | | 11/2009 | Dandurand | |
| 7,641,293 B2 | | 1/2010 | Doyle | |

(Continued)

FOREIGN PATENT DOCUMENTS

| | | | | |
|---|---|---|---|---|
| CN | 103118930 A | * | 5/2013 | ........... B62D 55/244 |
| EP | 2096021 A1 | | 9/2009 | |

(Continued)

OTHER PUBLICATIONS

International Search Report and Written Opinion of International Application No. PCT/US2020/040963, dated Oct. 8, 2020, 12 pp.
"Construction Tires and Tracks," Databook 2017, Camso (Applicant points out, in accordance with MPEP 609.04(a), that the year of publication, 2017, is sufficiently earlier than the effective U.S. filing date, so that the particular month of publication is not in issue), 51 pp.

(Continued)

*Primary Examiner* — S. Joseph Morano
*Assistant Examiner* — Emily G. Castonguay
(74) *Attorney, Agent, or Firm* — Shumaker & Sieffert, P.A.

(57) ABSTRACT

A tread pattern for a vehicle track, such as an endless track for earth-moving equipment, comprises a plurality of blocks. Each block includes two lateral traction portions extending in substantially opposite directions. The two lateral traction portions are longitudinally aligned and each define a pair of walls defining a plurality of steps. In some examples, each lateral traction portion may define an L-shape. For example, the lateral traction portions of each block may define a protrusion to define the "L" shape, and, in some examples, the protrusions may extend in opposite longitudinal directions. In some examples, the lateral traction portions of each block may be the same shape, where one lateral traction portion may be oriented at about 180 degrees relative to the other lateral traction portion.

23 Claims, 5 Drawing Sheets

(56) References Cited

U.S. PATENT DOCUMENTS

| | | |
|---|---|---|
| 7,841,675 B2 | 11/2010 | Choi |
| 8,465,109 B2 | 6/2013 | Kimura et al. |
| 9,855,985 B2 | 1/2018 | Jee et al. |
| 2006/0163944 A1* | 7/2006 | Tsuru .................. B62D 55/244 305/165 |
| 2009/0102283 A1 | 4/2009 | Choi |
| 2010/0033010 A1 | 2/2010 | Shimozono |
| 2012/0139334 A1* | 6/2012 | Pringiers .............. B62D 55/244 305/112 |
| 2013/0241278 A1* | 9/2013 | Nomizo ............... B62D 55/244 305/178 |
| 2015/0336430 A1 | 11/2015 | Sueyoshi et al. |
| 2016/0193882 A1 | 7/2016 | Mancinelli et al. |
| 2018/0297415 A1 | 10/2018 | Sgreccia et al. |

FOREIGN PATENT DOCUMENTS

| | | | |
|---|---|---|---|
| JP | 55140662 A | 11/1980 | |
| JP | 2000313370 A | 11/2000 | |
| JP | 3415418 B2 | 6/2003 | |
| KR | 101508135 B1 * | 4/2015 | ............. B62D 55/24 |

OTHER PUBLICATIONS

"Compact Rubber Crawler Base Belt Track (OEM)," madeinchina.com, retrieved from https://qzxintang.en.made-in-china.com/product/sBqnRwOxLUVK/China-Compact-Rubber-Crawler-Base-Belt-Track-OEM-.html on Feb. 26, 2019, 2 pp.

International Preliminary Report on Patentability from International Application No. PCT/US2020/040963, dated Jan. 18, 2022, 9 pp.

* cited by examiner

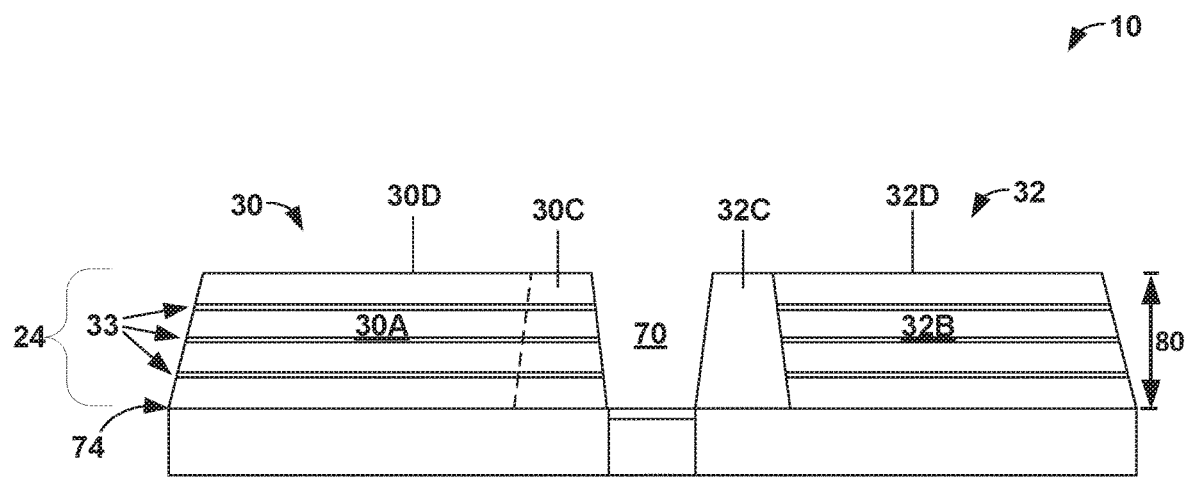
FIG. 3A
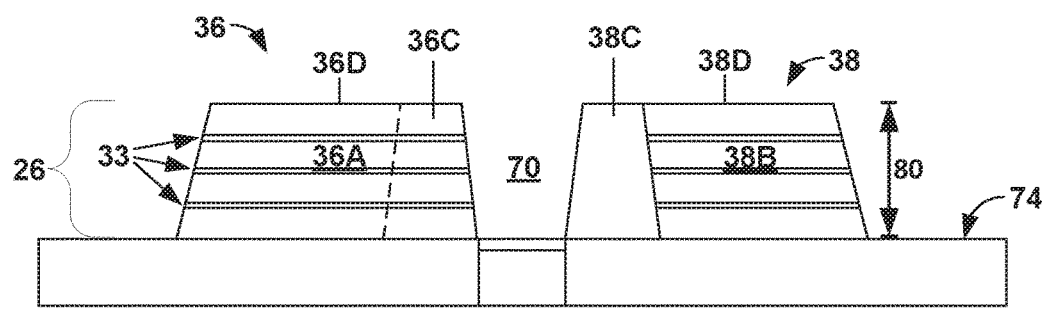
FIG. 3B
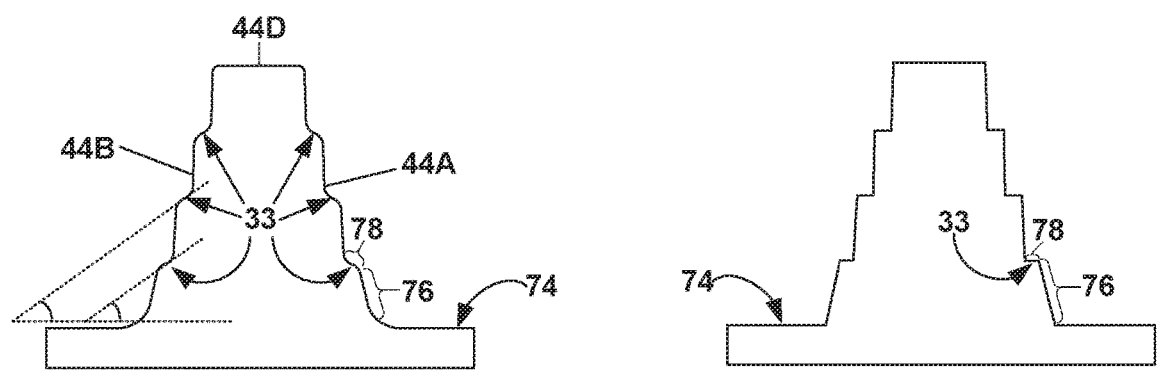
FIG. 4A
FIG. 4B

TREAD PATTERN

TECHNICAL FIELD

The disclosure relates to a track for a vehicle, and more particularly, to a tread design for a vehicle track.

BACKGROUND

Many off-road vehicles, such as earthmoving vehicles (e.g., excavators, skid steer track loaders or multi-terrain track loaders) and agricultural vehicles (e.g., rice harvester combines), include an endless track coupled to a drive system, which may include, for example, one or more drive sprockets. An endless track may provide traction on surfaces that traditional wheels having a circular cross-section may not be able to adequately grip. For example, a vehicle with an endless track may bridge a greater surface area than a vehicle with two or more circular wheels, which may enable the vehicle with the endless track to transverse surfaces that the vehicle with circular wheels would not ordinarily be able to transverse, such as uneven or loose surfaces (e.g., gravel or mud). In some cases, an endless track is formed of metal, rubber, such as a molded rubber, or a combination of metal and rubber. The endless track may be molded as a single, integral piece or an assembly of interconnected parts that are coupled together to define an endless track. The endless track can include a body with a first, interior side that engages with a drive system and a second, exterior side that defines a tread pattern.

SUMMARY

In some examples described herein, a tread pattern for a vehicle track, such as an endless track, includes a plurality of blocks that protrude from a common surface and define a ground contact surface of the track. Each block includes two lateral traction portions longitudinally aligned along a longitudinal axis (e.g., which may also be a circumferential axis) of the vehicle track. In some examples, each lateral traction portion may define an L-shape (e.g., a shape resembling the letter "L"). For example, each lateral traction portion of a block may define a protrusion to define the "L" shape, and, in some examples, the protrusions may extend in opposite longitudinal directions. In some examples, the lateral traction portions of each block may be the same shape, where one lateral traction portion may be oriented at about 180 degrees relative to the other lateral traction portion. In some examples, the lateral traction portions of each block extend from a central circumferential axis of the track in substantially opposite directions.

Each lateral traction portion may define walls extending from the common surface to a ground contact surface. In some examples, one or more walls of each lateral traction portion define a plurality of steps, which can be configured to provide improved traction in environments such as a ground surface comprised of deep mud.

In some examples, the blocks may be longitudinally spaced around the endless track such that the "L" pattern substantially uniformly repeats around the circumference of an endless track. In some examples, adjacent blocks may circumferentially be aligned or overlap with each other to provide a substantially continuous ground contact surface. In some examples, the generally "L" shape of each lateral traction portion may provide substantially equal traction power in both forward and reverse movements of the track.

Clause 1: In some examples, a vehicle track includes a first side configured to mount to a drive system of a vehicle, and a second side opposite the first side and defining a tread pattern including a first block having a first lateral portion; and a second lateral portion laterally offset from the first lateral portion, wherein the first and second lateral portions are longitudinally aligned; and a second block longitudinally offset from the first block, the second block having a third lateral portion substantially laterally aligned with the first lateral portion, wherein the second lateral portion and the third lateral portion overlap or align in a longitudinal direction; and a fourth lateral portion substantially laterally aligned with the second lateral portion, wherein the third and fourth lateral portions are longitudinally aligned. The first, second, third, and fourth lateral portions are substantially L-shaped, and each of the first, second, third, and fourth lateral portions defines at least two walls extending from a common surface of the second side of the track, wherein each of the at least two walls defines a plurality of steps.

Clause 2: In some examples of the track of clause 1, the first lateral portion and the second lateral portion are longitudinally aligned with one another at a first point along a circumferential axis, and the third lateral portion and the fourth lateral portion are longitudinally aligned with one another at a second point along the circumferential axis.

Clause 3: In some examples of the track of clause 1 or 2, each of the first, second, third, and fourth lateral portions includes a protrusion extending substantially longitudinally away from a transverse axis, and the protrusion of the second lateral portion and the protrusion of the third lateral portion overlap or align in the longitudinal direction along a circumferential axis.

Clause 4: In some examples of the track of any of clauses 1-3, a central channel extends in a circumferential direction between the first and second lateral portions and between the third and fourth lateral portions.

Clause 5: In some examples of the track of any of clauses 1-4, at least some of the steps of at least one of the walls define curvilinear edges.

Clause 6: In some examples of the track of any of clauses 1-5, at least some of the steps of at least one of the walls define straight edges.

Clause 7: In some examples of the track of any of clauses 1-6, each of the at least two walls defines three steps.

Clause 8: In some examples of the track of any of clauses 1-7, the steps are evenly spaced along their respective wall.

Clause 9: In some examples of the track of any of clauses 1-7, the steps are unevenly spaced along their respective wall.

Clause 10: In some examples of the track of any of clauses 1-9, a ground contact surface of each step is disposed at an acute angle relative to the common surface of the second side of the track.

Clause 11: In some examples of the track of any of clauses 1-10, the first and second lateral portions each extend a greater lateral distance from a central circumferential axis of the track than the second and third lateral portions extend from the central circumferential axis.

Clause 12: In some examples of the track of any of clauses 1-11, the walls of each lateral portion are tapered toward each other in a direction toward a ground contact surface.

Clause 13: In some examples of the track of any of clauses 1-12, each traction portion has a height-to-width ratio of about 50:45.

Clause 14: In some examples of the track of any of clauses 1-13, the first and second lateral portions have substantially similar shapes, wherein the second lateral portion is oriented at about 180 degrees relative to the first lateral portion.

Clause 15: In some examples of the track of any of clauses 1-14, each of the first, second, third, and fourth lateral portions extends a height of between 54 millimeters and 56 millimeters from the common surface of the second side of the track.

Clause 16: In some examples of the track of any of clauses 1-15, each of the walls faces in a generally circumferential direction around the second side of the track.

Clause 17: In some examples, a system includes a drive sprocket and an endless track coupled to the drive sprocket and defining a tread pattern including a first block having a first lateral portion and a second lateral portion laterally offset from the first lateral portion, wherein the first and second lateral portions are longitudinally aligned; and a second block longitudinally offset from the first block, the second block having a third lateral portion substantially laterally aligned with the first lateral portion, wherein the second lateral portion and the third lateral portion overlap or align in a longitudinal direction; and a fourth lateral portion substantially laterally aligned with the second lateral portion, wherein the third and fourth lateral portions are longitudinally aligned. The first, second, third, and fourth lateral portions are substantially L-shaped, and each of the first, second, third, and fourth lateral portions defines at least two walls extending from a common surface of the second side of the track, wherein each of the at least two walls defines a plurality of steps.

Clause 18: In some examples of the system of clause 17, each of the first, second, third, and fourth lateral portions comprises a protrusion extending substantially longitudinally away from a transverse axis, and wherein the protrusions of the second lateral portion and the third lateral portion overlap or align in the longitudinal direction along a circumferential axis.

Clause 19: In some examples of the system of clause 17 or 18, at least some of the steps of at least one of the walls define curvilinear edges.

Clause 20: In some examples of the system of any of clauses 17-19, each of the at least two walls defines three steps.

Clause 21: In some examples of the system of any of clauses 17-20, each of the first, second, third, and fourth lateral portions extends a height of between 54 millimeters and 56 millimeters from the common surface of the second side of the track.

Clause 22: In some examples of the system of any of clauses 17-22, the first and second lateral portions each extend a greater lateral distance from a central circumferential axis than the second and third lateral portions extend from the central circumferential axis.

Clause 23: In some examples, a vehicle track includes a first side configured to mount to a drive system of a vehicle; and a second side opposite the first side and defining a tread pattern including a first block having a first lateral portion and a second lateral portion laterally offset from the first lateral portion, wherein the first and second lateral portions each define a ground contact surface that defines a generally L shape; and a second block longitudinally offset from the first block, the second block having a third lateral portion substantially laterally aligned with the first lateral portion, wherein the second lateral portion and the third lateral portion overlap or align in a longitudinal direction; and a fourth lateral portion substantially laterally aligned with the second lateral portion, wherein the third and fourth lateral portions each define a ground contact surface that defines a generally L shape, wherein each of the first, second, third, and fourth lateral portions defines at least two walls extending from a common surface of the second side of the track, and wherein each of the at least two walls defines a plurality of steps.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 3A is a schematic cross-sectional end view of the body of the endless track shown in FIGS. 2A and 2B, where the cross-section is taken along line A-A in FIG. 2B.

FIG. 3B is a schematic plan view of the endless track shown in FIGS. 2A and 2B, where the cross-section is taken along line B-B in FIG. 2B.

FIGS. 4A and 4B are example schematic cross-sectional side views of the body of the endless track shown in FIGS. 2A and 2B, where the cross-section is taken along line C-C in FIG. 2B.

DETAILED DESCRIPTION

Figure 1:
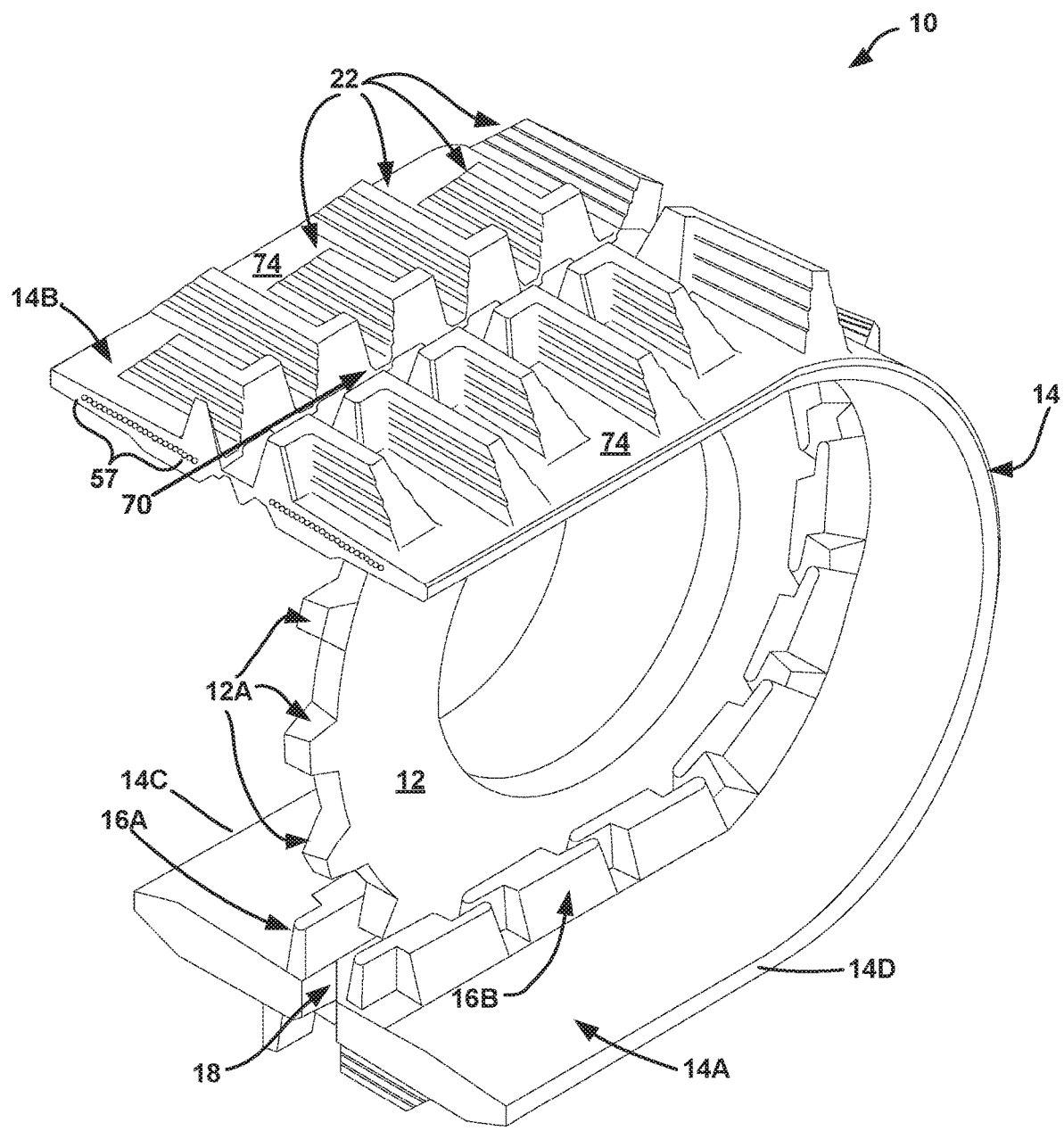
FIG. 1 is a schematic perspective view illustrating an example of an endless track mounted about a drive sprocket wheel comprising a plurality of teeth.

FIG. 1 is a schematic perspective view illustrating an example of endless track 10 mounted about drive sprocket wheel 12 comprising plurality of teeth 12A. Drive sprocket wheel 12 may be, for example, a part of a drive system of a vehicle. The drive system may also include one or more other drive sprocket wheels, such as a drive sprocket wheel that is positioned on an opposite end of endless track 10 from drive sprocket wheel 12. Drive sprocket wheel 12, which can be actuated by a drive motor, engages with endless track 10 and rotates endless track 10. As endless track 10 rotates and engages with a ground surface, a vehicle on which endless track 10 is mounted moves, depending on the direction in which endless track 10 rotates. In other examples, other drive mechanisms may be used to drive endless track 10. Endless track 10 may be used with an industrial vehicle, such as, but not limited to, an earthmoving vehicle (e.g., a skid steer loader) or an agricultural vehicle (e.g., a rice harvester combine).

In FIG. 1, a part of endless track 10 has been cut away to illustrate first side 14A and second side 14B of body 14. Second side 14B of body 14 is on an opposite side of body 14 from first side 14A. Disposed between first and second sides 14A, 14B of body 14 are reinforcing members 57, which are described in further detail below.

First side 14A defines an inner circumference of body 14 and may be configured to mount endless track 10 to a drive system of a vehicle. In the example of FIG. 1, first side 14A comprises two rows of guide portions 16A and 16B (collectively "guide portions 16") that may enable alignment and engage drive sprocket wheel 12 with endless track 10.

In some examples, guide portions 16 may define channel 18 that may be sized and shaped to receive drive sprocket wheel 12. Guide portions 16 of each row may be longitudinally (or circumferentially in the case of an endless track) aligned with a corresponding guide portion 16 in the opposing row (e.g., guide portion 16A may be aligned with opposing guide portion 16B). In other examples, guide portions 16A may be arranged to partially longitudinally align or overlap with a corresponding guide portion 16B in the opposing row. In yet other examples, guide portions 16A may alternate with guide portions 16B of the opposing row such that guide portions 16 may not be longitudinally aligned with the corresponding guide portion 16 in the opposing row.

First side 14A of body 14 may also define a plurality of ribs that may be configured to engage with teeth 12A of drive sprocket wheel 12 when endless track 10 is mounted on drive sprocket wheel 12. As drive sprocket wheel 12 rotates, teeth 12A may engage with apertures defined between the plurality of ribs (e.g., apertures 54 as described with respect to FIGS. 2A and 2B), which may rotate endless track 10. The rotation of endless track 10 may cause endless track 10 (and any vehicle on which endless track 10 is mounted) to move in a first direction (e.g., forward or backward). If drive sprocket wheel 12 is rotated in a direction opposite the first direction, then the rotation of endless track 10 may cause endless track 10 to move in a second direction (e.g., forward or backward). In some examples, a vehicle with two endless tracks 10 mounted may move in a third direction or a fourth direction (e.g., left or right) when the first endless track 10 moves in the first direction and the second endless track 10 moves in the second direction.

While drive sprocket wheel 12 is shown in the example of FIG. 1, in other examples, other drive systems may be used to support and drive endless track 10. For example, rather than engaging with a center of first side 14A of body 14, the vehicle drive system may include sprockets that engage with sidewall 14C, 14D of body 14. For example, first side 14A of body 14 may include guide portions that are adjacent to sidewall 14C, 14D of body 14, rather than substantially centered, as shown in FIG. 1.

Second side 14B of body 14 defines an outer circumference of body 14 and may be configured to engage with an exterior surface (e.g., the ground), and thus, second side 14B may be referred to as an "exterior" side of body 14. Second side 14B includes a tread pattern 22 extending from a common surface 74. Common surface 74 is a surface from which individual blocks of tread pattern 22 protrude. In some examples, common surface 74 is substantially smooth and may or may not be planar at any given point. Accordingly, common surface 74 surrounds one or more individual traction portions that make up tread pattern 22, and may also contact a ground surface when track 10 is used with certain types of ground surfaces, such as muddy ground surfaces. In some examples, common surface 74 may be composed of multiple discontinuous surface sections. For example, as shown in FIG. 1, common surface 74 includes two distinct but co-level surfaces (e.g., linearly aligned with one another along any transverse axis) separated by a central circumferential channel 70.

Body 14 includes tread pattern 22 on second side 14B of body 14. Tread pattern 22 is defined by multiple traction portions extending from common surface 74. Tread pattern 22 may be configured to engage the exterior (ground) surface when vehicle track 10 is mounted on a vehicle.

In some examples, endless track 10 may be used on a vehicle that is configured to be used for a range of applications and a range of ground surfaces. Tread pattern 22 may be configured to exhibit good traction in low-viscosity ground surfaces such as deep mud. For example, track 10 may have relatively tall treads (e.g., defined by the traction portions of tread pattern 22) compared to other tracks configured for the same vehicle, where the relatively tall treads are configured to push through deep mud, similar to a paddle through water. Further, tread pattern 22 may include an open central channel 70 configured to allow for the passage and clearance of mud from between individual traction portions of the blocks of tread pattern 22.

In some examples, as discussed in further detail below, individual traction portions of tread pattern 22 may define two or more walls extending from common surface 74. Each wall may define a plurality of steps running across the width of the respective wall. These steps may provide improved traction in low-viscosity environments such as a ground surface comprised of deep mud compared to walls that do not include the steps. For example, a stepped wall surface (as opposed to a smooth surface) may help to disrupt or restrict the movement or flow of mud along the surface of the wall, enabling the respective traction portion to better "push off" the mud, similar to a paddle.

The structural configuration of tread pattern 22, including any suitable combination of the relatively tall treads, open central channel 70, and traction portions defining stepped walls, may configure track 10 for use relatively extreme ground conditions. For example, track 10 may be suitable for use with a rice harvester combine, which may be used on both wet (e.g., muddy) and dry surfaces.

Figure 2A:
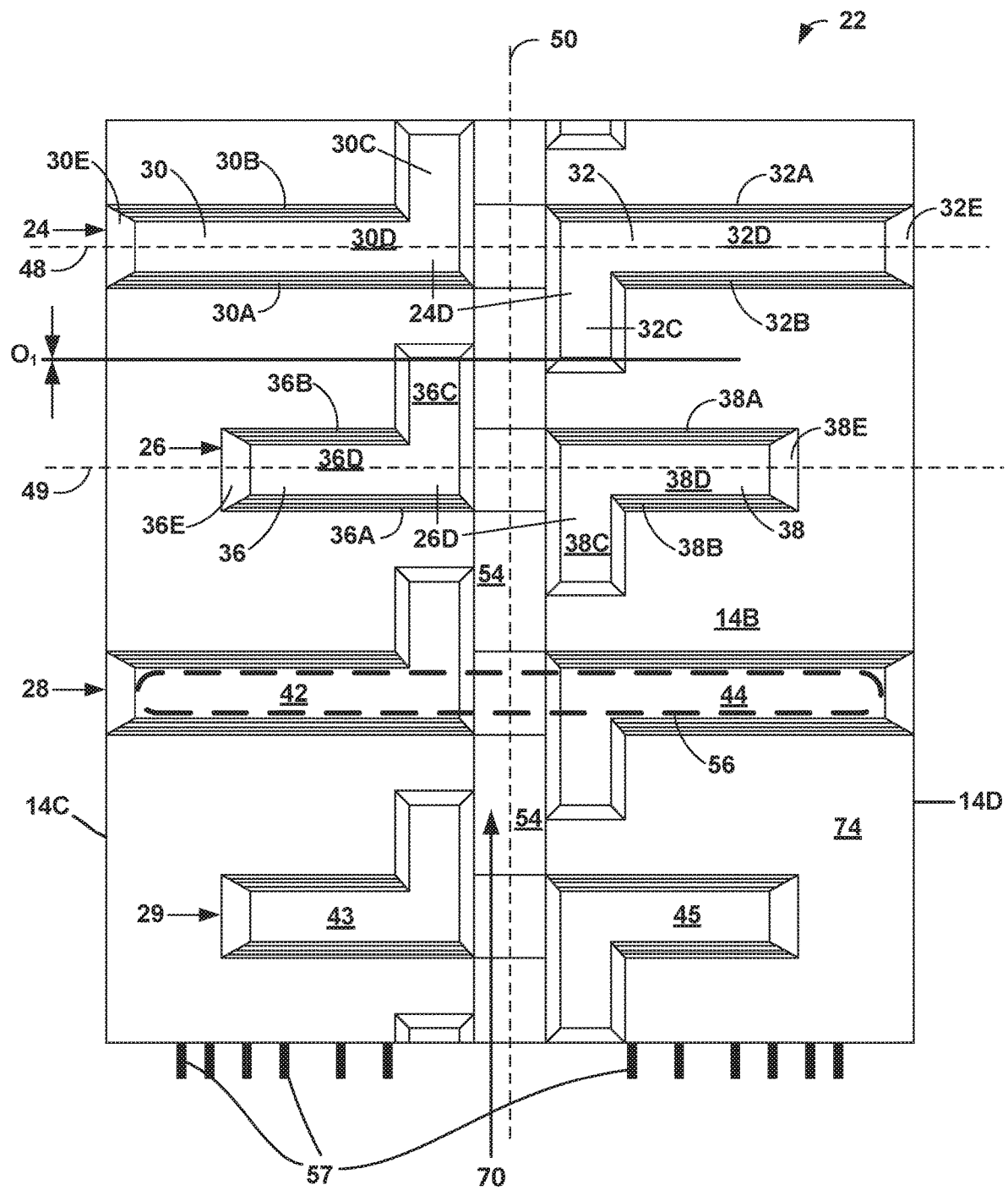
FIG. 2A is a schematic plan view of the endless track shown in FIG. 1 and illustrates an example tread pattern.

Tread pattern 22 is shown in further detail in FIGS. 2A-4. FIG. 2A is a schematic plan view of endless track 10 shown in FIG. 1 and illustrates example tread pattern 22. In the example of FIG. 2A, tread pattern 22 includes a plurality of blocks. Tread pattern 22 may be defined by a substantially uniformly repeating pattern of blocks. In the portion of tread pattern 22 shown in FIG. 2A, tread pattern 22 includes four blocks 24, 26, 28, and 29. However, second side 14B of body 14 may include more than the four blocks 24, 26, 28, and 29 shown in FIG. 2A, and typically may include as many blocks as necessary to repeat along the outer circumference of body 14. Block 24 includes first lateral traction portion 30 and second lateral traction portion 32. Block 26 includes third lateral traction portion 36 and fourth lateral traction portion 38. Block 28 includes fifth lateral traction portion 42 and sixth lateral traction portion 44. Block 29 includes seventh lateral traction portion 43 and eighth lateral traction portion 45.

Because blocks 24 and 28 may be substantially similar (e.g., identical or nearly identical, but with manufacturing variances) and blocks 26 and 29 may be substantially similar, only blocks 24 and 26 will be described in further detail, with the understanding that the description of block 24 may be applicable to the description of block 28, and the description of block 26 may be applicable to the description of block 29.

In some examples, lateral traction portions 30 and 32 of block 24, and lateral portions 36 and 38 of block 26, may each define a surface 30D, 32D, 36D, 38D, respectively, that collectively defines the outermost surface of second side 14B (furthest from first side 14A of body 14), and thus, define the ground contact surfaces 24D, 26D, of blocks 24 and 26, respectively. The outermost surface 30D, 32D, 36D, and 38D of each traction portion 30, 32, 36, and 38, respectively, is shown in FIG. 2A. To aid in the description of tread pattern 22, transverse axes 48 and 49 (e.g., axes extending in a transverse or lateral direction) and circumferential axis 50 (e.g., a longitudinal axis extending substantially along the outer circumference of body 14 or in a substantially longitudinal direction in the case of a vehicle track that does not comprise an outer circumference) are shown in FIG. 2A. Transverse axes 48, 49 and circumferential axis 50 may be generally perpendicular to each other.

First and second traction portions 30 and 32 are laterally offset from one another (e.g., spaced apart from each other along transverse axis 48) and longitudinally aligned with each other (e.g., center axes of portions 30, 32 that extend in the transverse axis 48 are aligned along circumferential axis 50). In some examples, the longitudinal alignment of traction portions 30 and 32 may enable endless track 10 to have increased initial startup traction, when compared to other endless track designs. In some examples, traction portions 30 and 32 may be longitudinally offset from one another, but at least partially overlapping in the longitudinal direction.

Each traction portion 30, 32 defines a pair of walls 30A, 30B and 32A, 32B, respectively, extending from common surface 74 of second side 14B of track 10. In addition, first and second traction portions 30 and 32 each includes a protrusion extending substantially longitudinally away from transverse axis 48, such that each portion 30, 32 defines an L-shaped traction portion (e.g., when viewed from the perspective shown in FIG. 2A). For example, in the example shown in FIG. 2A, first traction portion 30 includes first protrusion 30C extending longitudinally away from transverse axis 48, and second traction portion 32 includes second protrusion 32C extending longitudinally away in an opposite direction from transverse axis 48. As a result, as shown in FIG. 2A, traction portions 30, 32 may define L-shapes that face in different, opposite directions. In some examples, portions 30, 32 may each define an L-shape having curvilinear edges. For example, the corners where walls 30A, 30B meet ground contact surface 30D may be rounded. In other examples, the L-shapes may have straight edges, as shown in FIG. 2A, or both curvilinear and straight edges. For example, the corners where walls 30A, 30B meet outermost surface 30D may define sharp angles.

Third and fourth traction portions 36 and 38 are laterally offset from one another (e.g., spaced apart from each other along transverse axis 49) and longitudinally aligned with each other (e.g., center axes of portions 36, 38 that extend in the transverse axis 49 are aligned along circumferential axis 50). In some examples, the longitudinal alignment of traction portions 36 and 38 may enable endless track 10 to have increased initial startup traction, when compared to other endless track designs.

In some examples, third and fourth traction portions 36 and 38 each includes a protrusion extending substantially longitudinally away from transverse axis 49, such that each portion 36, 38 defines an L-shaped traction portion (e.g., when viewed from the perspective shown in FIG. 2A). For example, in the example shown in FIG. 2A, third traction portion 36 includes third protrusion 36C extending longitudinally away from transverse axis 49, and fourth traction portion 38 includes fourth protrusion 38C extending longitudinally away in an opposite direction from transverse axis 49. As a result, as shown in FIG. 2A, portions 36, 38 may define L-shapes that face in different, opposite directions. In some examples, portions 36, 38 may each define an L-shape having curvilinear edges. For example, the corners where walls 36A, 36B meet ground contact surface 36D may be rounded. In other examples, the L-shapes may have straight edges, as shown in FIG. 2A, or both curvilinear and straight edges. For example, the corners where walls 36A, 36B meet outermost surface 36D may define rigid angles.

In some examples, each of first lateral portion 30 and second lateral portion 32 may be wider than either third lateral portion 36 or fourth lateral portion 38, wherein a width is measured along transverse axes 48, 49 or in a direction parallel to transverse axes 48, 49. In other words, first lateral portion 30 and second lateral portion 32 may each extend farther along transverse axis 48 than third lateral portion 36 and fourth lateral portion 38 extend along transverse axis 49. As shown in FIG. 2C, width $W_{30A}$ of wall 30A of first traction portion 30 may be greater than width $W_{36A}$ of wall 36A of third traction portion 36.

In some examples the respective protrusions 30C, 32C, 36C, 38C, 42C, 44C, 43C, and 45C of lateral traction portions 30, 32, 36, 38, 42, 44, 43, and 45 may collectively define the boundaries of an open central channel 70 that extends along longitudinal axis 50. This open central channel 70 may facilitate the clearance of mud, soil, or other terrain by providing a pathway for the terrain to move from in between the respective lateral traction portions (e.g., from between lateral traction portions 30 and 32).

In some examples, protrusions 30C and 32C of first and second lateral traction portions 30 and 32, respectively, may be aligned or overlap with the protrusions of adjacent lateral traction portions of adjacent blocks in a longitudinal direction, e.g., a direction parallel to longitudinal axis 50. For example, second protrusion 32C of second lateral traction portion 32 may longitudinally be aligned or overlap with third protrusion 36C of third lateral traction portion 36 of block 26. In this way, adjacent blocks 24, 26 may longitudinally be aligned or overlap, respectively. Blocks that are arranged such that at least one traction portion of one block longitudinally, but not laterally, aligns or overlaps with one traction portion of an adjacent block may help increase the smoothness with which track 10 traverses a surface and increase the stability of a vehicle on which track 10 is mounted compared to a track that does not have overlapping blocks. The aligned or overlapping blocks may provide a smoother ride for a passenger in the vehicle on which track 10 is mounted because the aligned or overlapping adjacent blocks define a substantially continuous ground contact surface.

The amount of longitudinal overlap between adjacent blocks 24, 26, 28, 29 is represented in FIG. 2A by overlap distance $O_1$. In some examples, the extent of longitudinal overlap (e.g., the magnitude of overlap distance $O_1$) between protrusions of adjacent blocks 24, 26, 28, 29 may be selected to achieve a substantially continuous ground contact surface, while still maintaining a relatively high level of traction. In some examples, protrusions 32C, 36C of adjacent blocks may be aligned with no overlap distance (i.e., overlap distance $O_1$ is zero or nearly zero, taking into consideration manufacturing tolerances). In other examples, protrusions 32C, 36C of adjacent blocks may overlap in a longitudinal direction by an overlap distance of about 1 millimeter (mm) or less, such as less than about 0.5 mm, or less than about 0.10 mm, such as about 0.06 mm. In yet other examples, protrusions 32C, 36C of adjacent blocks may overlap by an overlap distance greater than 1 mm.

In contrast to endless track 10 including traction blocks that include longitudinally aligned or overlapping protrusions, a straight bar design traction design, which does not include longitudinally aligned or overlapping portions, may provide a relatively rough ride because the adjacent blocks are not aligned or overlapping and have a discontinuous ground contact surface. The space between each adjacent block in the straight bar design, while contributing to traction, may cause continuous bumping with the ground. In this way, tread pattern 22 may provide a smoother ride than a straight bar design because adjacent blocks 24 and 26 are in continuous contact with the ground, whereas the adjacent blocks of the straight bar design are not in continuous contact with the ground.

In some examples, the greater the extent of overlap between protrusions of adjacent blocks 24, 26, 28, 29, the less traction endless track 10 may provide with a ground contact surface. Thus, the relative smoothness of the ride provided by endless track 10 and the traction provided by endless track may be modified by adjusting the extent of overlap between protrusions of adjacent blocks 24, 26, 28.

As discussed above and herein, an arrangement of blocks may be repeated on second side 14B of body 14 in a longitudinal direction to define tread pattern 22. Adjacent blocks may be aligned or overlap with each other by an overlap distance. For example, an overlap distance of overlapping adjacent blocks may be described using first and second blocks 24 and 26. An edge of second protrusion 32C of second traction portion 32 (e.g., the edge may be defined by an edge of a ground contact surface 32D) of first block 24 longitudinally aligned or overlaps with closest edge of third protrusion 36C of third traction portion 36 of second block 26 in a longitudinal direction by overlap distance $O_1$. In some examples, overlap distance $O_1$ may be about 0.01 mm to about 5 mm. For example, overlap distance $O_1$ may be about 0.04 mm or about 0.06 mm. However, in accordance with this disclosure, each block 24, 26, and 28, 29 may overlap with an adjacent block by any suitable overlap distance $O_1$. In examples in which protrusions of adjacent blocks 24, 26, 28 are longitudinally aligned, overlap distance $O_1$ may be 0 mm. The example overlap distance $O_1$ values provided herein, as well as the other dimensions provided herein, are for descriptive purposes and the present disclosure is no way limited to the dimensions provided herein.

In some examples, first and second lateral traction portions 30 and 32 may be substantially the same size (e.g., identical sizes or nearly identical sizes, but for manufacturing variances), may have substantially the same shape (e.g., identical shapes or nearly identical shapes, but for manufacturing variances), or may both be substantially the same shape and size. In other examples, first and second lateral traction portions 30 and 32 may not be substantially the same size or shape. In the example of FIG. 2A, first and second traction portions 30 and 32, respectively, have substantially the same shape, but are oriented at about 180 degrees with respect to each other.

In the example shown in FIG. 2A, first and second traction portions 30 and 32 extend from longitudinal axis 50 by substantially equal distances along the transverse axis 48. In other examples, first and second traction portions 30 and 32 may extend away from longitudinal axis 50 (along transverse axis 48) by different distances. For example, a furthermost distance from longitudinal axis 50 to wall 30E of first traction portion 30 adjacent to shoulder 14C may not be equal to a distance from the same point on longitudinal axis 50 to wall 32E of second traction portion 32 adjacent to shoulder 14D.

In some examples, track 10 defines a tread pattern 22 having blocks of alternating widths, as measured along transverse axes. For example, block 24 may be "wider" along transverse axis 48 than block 26 is along transverse axis 49. Thus, in some examples, when inner edges of blocks 24, 26 (closest to central channel 70) are aligned along with each other, wall 30E of traction portion 30 of block 24 may be closer to sidewall or shoulder 14C than wall 36E of traction portion 36 of block 26. Similarly, in some examples, when inner edges of blocks 24, 26 (closest to central channel 70) are aligned along with each other, wall 32E of traction portion 32 of block 24 may be closer to sidewall or shoulder 14D than wall 38E of traction portion 38 of block 26. In some examples, tread pattern 22 having alternating-width tread blocks may facilitate the clearance of mud, dirt, or other terrain from in between consecutive pairs of tread blocks, e.g., by defining a larger open volume adjacent to sidewalls 14C, 14D for the mud and/or other material to exit.

Lateral traction portions 30, 32, 36, and 38 extend from common surface 74 and define a height 80 (FIGS. 3A and 3B) relative to common surface 74, measured in a direction perpendicular to common surface 74 (e.g., away from first side 14A of track 10). In some examples, lateral traction portions 30, 32, 36, and 38 may have a relatively taller or higher height than typical tread blocks. For example, lateral traction portions 30, 32, 36, and 38 may have a height of about 54 to 56 millimeters, compared to more typical ranges of around 38 to 45 millimeters. Higher or deeper tread blocks may increase the traction of endless track 10 by increasing the overall volume between adjacent blocks. Increasing the volume between adjacent blocks 24, 26, 28, 29 of endless track 10 may increase the amount of mud, dirt, and other terrain (e.g., ground substances) that may be trapped between adjacent blocks 24, 26, 28, which may increase the ground traction provided by endless track 10.

Each of the lateral traction portions 30, 32, 36, and 38 defines walls extending from common surface 74 to a respective ground contact surface. For example, first traction portion 30 defines walls 30A and 30B that extend from common surface 74 to ground contact surface 30D (which may also be referred to as an outermost surface of traction portion 30). Second traction portion 32 may similarly define walls 32A, 32B that extend from common surface 74 to ground contact surface 32D. Third and fourth traction portion 36 and 38 may similarly define walls 36A, 36B, 38A, and 38B that extend from common surface 74 to respective ground contact surfaces.

As described in further detail with reference to FIG. 4, in some examples, walls 30A, 30B, 32A, 32B, 36A, 36B, 38A, and 38B each define one or more lateral "steps" configured to improve traction, such as along muddy ground surfaces. As an example, wall 30A may define three evenly-spaced steps, each step extending laterally along the entire width of the wall 30A.

In the example of FIG. 2A, apertures 54 may be sized and shaped to receive teeth 12A of drive sprocket wheel 12 as described in FIG. 1. Apertures 54 may be defined by guide portions 16 within channel 18 on first side 14A of body 14 (shown in FIG. 1).

In order to increase the strength of endless track 10, support cores 56 (shown in phantom lines) may be coupled to body 14. Support cores 56 may also be referred to as "links" of endless track 10. Support cores 56 may be embedded in body 14 or attached to one or both sides 14A, 14B of body 14. For example, body 14 may comprise multiple layers of material and support cores 56 may be positioned between the multiple layers of material. In other examples, body 14 may be molded, and support cores 56 may be introduced into the molding material prior to curing the material to form body 14. In yet other examples, support cores 56 may be adhered to body 14 using any suitable adhesive.

Support cores 56 may be made of any suitable material and in any suitable configuration. For example, support cores 56 may be formed from steel, iron, or any other suitable material or combination thereof. In some examples, support cores 56 may have two sections, where a first section may be configured to engage with the drive sprocket teeth 12A (FIG. 1) to move endless track 10, and a second section may be the remainder of the body of support core 56. In some examples, the two sections of support core 56 may be integrated into a single support core. In other examples, the two sections of support core 56 may not be integrated into a single support core. For example, support core 56 may be a single, integral component, and may be manufactured by hot forging using metal rods, casting from metal, or any other suitable manufacturing process. In some examples, support cores 56 may have a rectangular shape with rounded corners as shown in FIG. 2A. In other examples, support cores 56 may be any suitable configuration.

Although FIG. 2A depicts only a single support core 56 corresponding to block 28, one support core 56 may correspond to each block 24, 26, 28, and 29. For example, each block 24, 26, 28, and 29 may be centered over one support core 56. In other examples, multiple support cores 56 may correspond to each block 24, 26, and 28 or one support core 56 may span two or more blocks 24, 26, 28, and 29.

Second side 14B of body 14 and traction portions 30, 32, 36, and 38 may receive a high impact force when teeth 12A of drive sprocket wheel 12 engage with apertures 54 and drive sprocket wheel 12 contacts portions of body 14 comprising support cores 56. In these examples, if blocks 24 and/or 26 are located between drive sprocket wheel 12 of the vehicle and the ground, the high impact force may be received by blocks 24 and/or 26 because blocks 24 and/or 26 must support the weight of the vehicle. In the example of FIG. 2A, the impact force from drive sprocket wheel 12 and the weight of the vehicle may be distributed over ground contact surfaces 30D and 32D of traction portions 30 and 32, respectively, and over at least one support core 56. In some examples, traction portions of each block 24, 26, 28, and 29 and support cores 56 in tread pattern 22 may spread the impact force laterally, which may reduce the occurrence of cracking in any areas of tread pattern 22 that experience an unbalanced impact force. For instance, uneven mounting of endless track 10 on a vehicle may cause an unbalanced impact force and uneven wear of tread pattern 22, among other things.

Endless track 10 may include multiple reinforcing members 57 coupled to body 14 to further increase the strength of endless track 10. For example, reinforcing members 57 may extend in a substantially longitudinal direction along circumferential axis 50. In some examples, reinforcing members 57 may be similar to support cores 56, such that reinforcing members 57 may be embedded in body 14 by placing reinforcing members 57 between layers in body 14 or embedding reinforcing member 57 in body 14 during a molding process. In the example of FIG. 2A, twelve reinforcing members 57 are symmetrically arranged about circumferential axis 50, however, endless track 10 may include any suitable number of reinforcing members 57 in any suitable arrangement. In some examples, body 14 may include about 28 to about 80 reinforcing members 57. For example, the number of reinforcing members 57 may be selected based on the width $W_{14}$ (FIG. 2B) of body 14 and the desired application of endless track 10.

Reinforcing members 57 may be a flexible steel cord (or cable) and may have a minimum tensile strength of about 400 kilograms. In some examples, the ends of each reinforcing member 57 may be coupled together. For example, the ends of each reinforcing member 57 may be adjacent to each other, which may be referred to as a jointless connection. In other examples, the ends of each reinforcing member 57 may overlap in the longitudinal, lateral, and/or radial direction, which may be substantially perpendicular to the circumferential and transverse axes 50, 48, respectively, and may be referred to as a jointed connection.

Body 14 of endless track 10 may be defined by a single molded piece of material or may be an assembly of interconnected parts that are coupled or bonded together to define an endless track. In some examples, body 14 of endless track 10 may be composed at least in part of a natural rubber, a synthetic rubber, combinations thereof, or other elastomeric materials. Examples of suitable synthetic rubbers may include, but not limited to, styrene butadiene rubber and polybutadiene rubber, or any other suitable synthetic rubber. In some examples, body 14 may also include other components to enable desired material properties. For example, body 14 may include, but not limited to, reinforcing agents, vulcanization accelerators, antiozonants, antioxidants, vulcanizing agents, retarders, rubber softeners, tackifiers, and any other suitable component to enable the desired material properties. In some examples, the exact composition of body 14 may depend upon various factors, including, but not limited to, a particular application and/or the range of applications of endless track 10.

In some examples, body 14 may be elastomeric, which may provide better maneuverability of a vehicle, better ride quality, and increased traction as compared to steel endless tracks. In some examples, the rubber of first side 14A (including guide portions 16) may have a hardness in a range about 63 durometer to about 83 durometer. For example, a rubber of first side 14A may have a hardness of about 73 durometer. In some examples, the rubber of second side 14B (including blocks 24, 26, and 28) may have a hardness in a range of about 53 durometer to about 73 durometer. For example, a rubber of second side 14B may have a hardness of about 63 durometer. In some examples, blocks 24, 26, and 29 may be softer than first side 14A of body 14 because performance of endless track 10 may be improved when traction portions 30-44 are able to conform to a range of ground conditions. In these examples, guide portions 16 on first side 14A may be relatively rigid as compared to traction portions 30-45 to provide sufficient engagement with drive sprocket wheel 12.

Figure 2B:
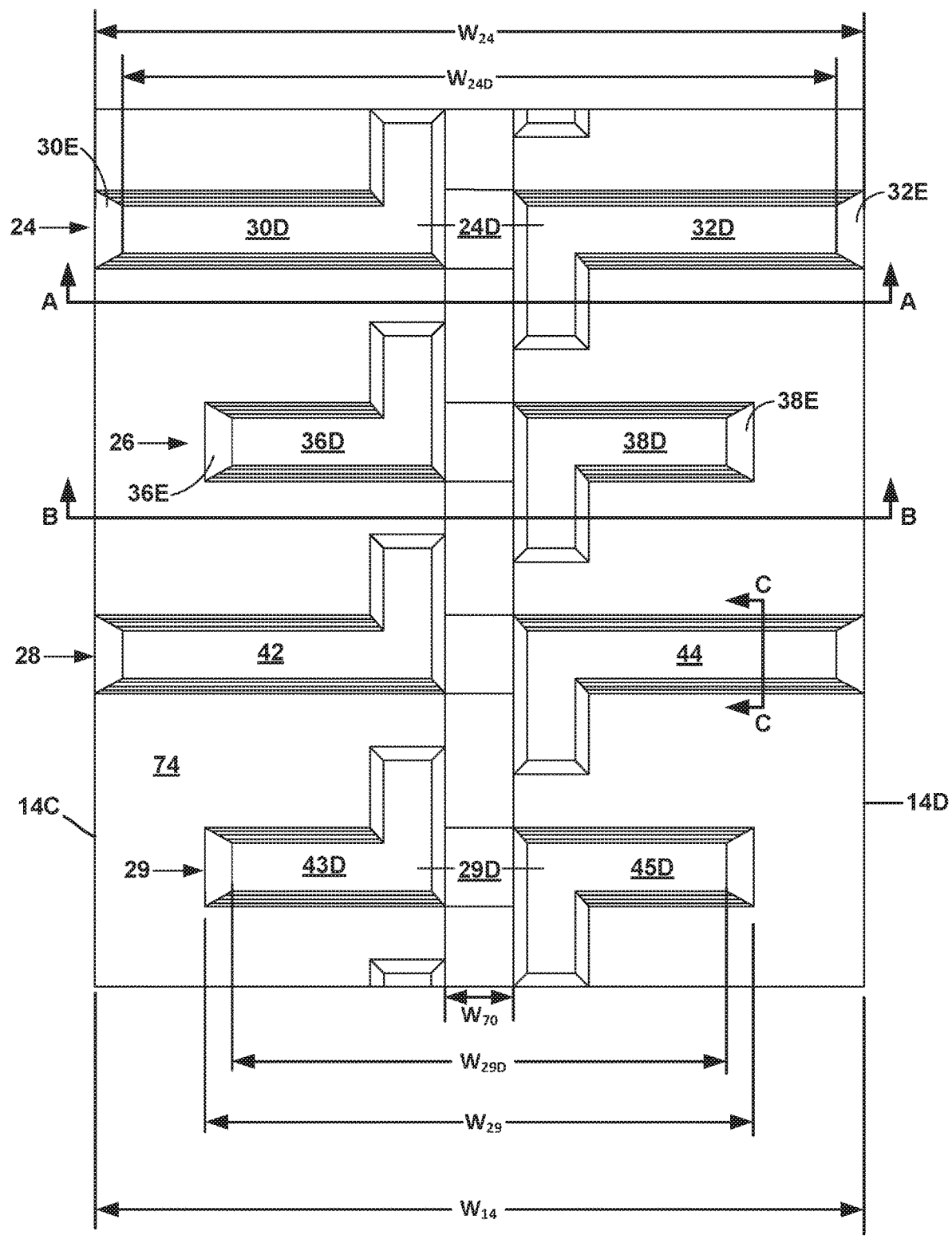
FIG. 2B is a schematic plan view of the endless track shown in FIG. 1 and illustrates example dimensions of the tread pattern shown in FIG. 2A.
Figure 2C:
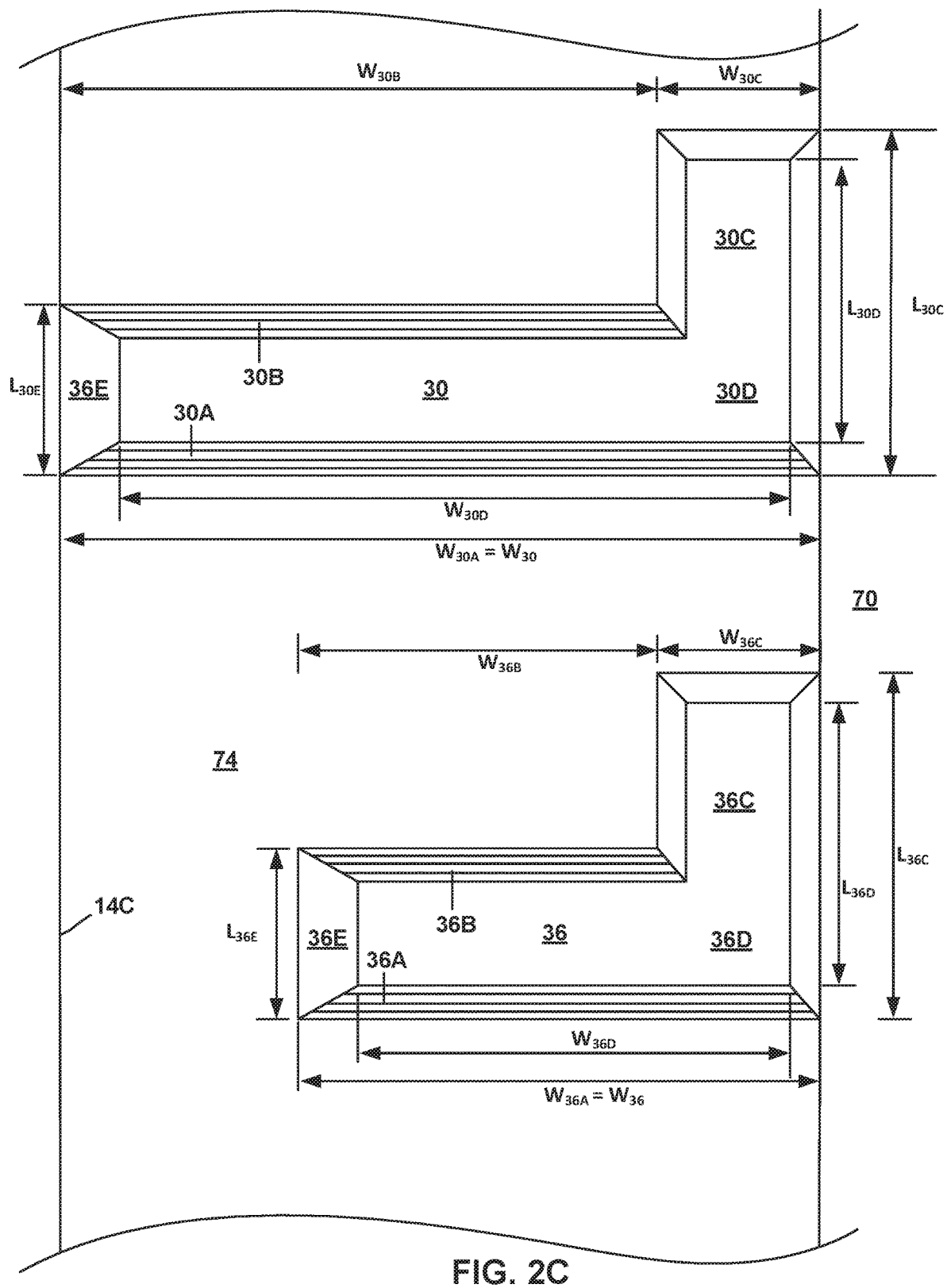
FIG. 2C is a schematic plan view of the endless track shown in FIG. 1 and illustrates example dimensions of the tread pattern shown in FIGS. 2A and 2B.

FIG. 2B is a schematic plan view of endless track 10 shown in FIG. 1 and illustrates example dimensions of tread pattern 22 shown in FIG. 2A. Reinforcing members 57 have been removed from FIG. 2B for clarity of illustration. Again, the dimensions described with respect to traction portions 30 and 32 of the first block 24 may also be applicable to traction portions 42 and 44, respectively, of third block 28. Similarly, the dimensions described with respect to traction portions 43 and 45 of fourth block 29 may also be applicable to traction portions 36 and 38, respectively, of second block 26.

Body 14 of track 10 has an overall width $W_{14}$, extending from sidewall 14C to sidewall 14D and measured in a direction parallel to transverse axis 48. Body 14 may have any suitable width $W_{14}$, which may depend upon the particular application of endless track 10 and the vehicle with which endless track 10 is used. In some examples, endless track 10 may be used with a skid steer loader, excavator, carrier, dumper, multi-terrain loader, compact track loader, agricultural machine, stump cutter machine, a trenching machine, or any other suitable machine. In these examples, body 14 may have a width $W_{14}$ of about 150 millimeters (mm) to about 915 mm. For example, width $W_{14}$ may be about 250 mm. In other examples, width $W_{14}$ may be about 200 mm, 230 mm, 300 mm, 320 mm, 400 mm, and 450 mm.

In some examples, first block 24 may extend the entire width $W_{14}$ of body 14 of track 10. Because walls 30E, 32E are tapered (e.g., angled with respect to common surface 74), the ground contact surface 24D (collectively defined by surfaces 30D and 32D extending from wall 30E to wall 32E may not extend the full width $W_{14}$ of body 14 of track 10. For example, width $W_{24D}$ of the ground contact surface 24D of first block 24 may be about 75 percent (%) to about 100% of width $W_{14}$ of body 14 of track 10. In the example of FIG. 2B, width $W_{24D}$ of ground contact surface 24D of first block 24 may be about 88.56% of width $W_{14}$ of body 14. In some examples, width $W_{24D}$ may be between 200 mm and 230 mm. For example, width $W_{24D}$ may be about 221.4 mm. Block 24 in tread pattern 22 may distribute the impact force from drive sprocket wheel 12 and any other drive wheels of a vehicle drive system substantially over the width $W_{14}$ of body 14 because the total width $W_{24}$ of block 24 is a majority of the width $W_{14}$ of body 14. In some examples, tread pattern 22 may enable the distribution of impact forces over a relatively large percentage (e.g., 75% or greater) of the width $W_{14}$ of body 14, which may enable a relatively smooth vehicle operation. In some examples, tread pattern 22 may also provide relatively good traction in very low-traction environments, such as deep mud.

In some examples, width $W_{29D}$ of ground contact surface 29D (formed collectively by ground contact surfaces 43D and 45D) of fourth block 29 may be about 50 percent (%) to about 75% of width $W_{14}$ of body 14. In the example of FIG. 2B, a total width $W_{29D}$ of ground contact surface 29D of fourth block 29 may be about 60% of width $W_{14}$ of body 14. In some examples, width $W_{29D}$ may be between 150 mm and 200 mm. For example, width $W_{29D}$ may be about 175 mm. In some examples, Central channel 70 may have a width $W_{70}$ between 30 mm and 50 mm, such as about 40 millimeters.

FIG. 2C is a is a schematic plan view of endless track 10 shown in FIG. 1 and illustrates example dimensions of tread pattern 22 shown in FIGS. 2A and 2B. The conjunction of each individual traction portion 30, 36 with its corresponding protrusion 30C, 36C defines an L-shape. In some examples, the widths $W_{30}$, $W_{36}$ of the respective traction portions 30, 36 are greater than the lengths $L_{30C}$, $L_{36C}$ of the respective protrusions 30C, 36C. For example, the width $W_{30}$ of traction portion 30 (or equivalently, the width $W_{30A}$ of wall 30A, because wall 30A extends the entire width of traction portion 30), may be about 2 times to about 4 times, such as about 2.6 to about 3.2 times, as long as the length $L_{30C}$ of protrusion 30C, depending on the track width. In some examples, the width $W_{30C}$ of protrusion 30C may be approximately equal to (e.g., equal to but for manufacturing tolerances) the length $L_{30E}$ of wall 30E of traction portion 30. In some examples, the widths $W_{30}$, $W_{36}$ of the respective traction portions 30, 36 are equal to or less than the lengths $L_{30C}$, $L_{36C}$ of the respective protrusions 30C, 36C. In some examples, individually, traction portion 30 may have a width $W_{30}$ that is about 200 mm to about 275 mm (e.g., 200 mm to 275 mm but for manufacturing tolerances), such as about 205 mm to about 255 mm, and, e.g., in the case of a 90 mm pitch track, a length $L_{30E}$ of about 57 mm. In some examples, traction portion 30 defines an L-shaped ground contact surface 30D having a width $W_{30D}$ of about 150 mm to about 275), such as about 175 mm to about 245 mm, and a length $L_{30D}$ of about 75 mm to about 125 mm, such as about 100 mm.

In some examples, the width $W_{36}$ of traction portion 36 (or equivalently, the width $W_{36A}$ of wall 36A, since wall 36A extends the entire width of traction portion 36) may be about 1.7 to about 2.5 times as the length $L_{36C}$ of protrusion 36C, such as about 1.7 and about 2.3 times as long. In some examples, the width $W_{36C}$ of protrusion 36C may be approximately equal to the length $L_{36E}$ of wall 36E of traction portion 36. In some examples, individually, traction portion 36 may have a width $W_{36}$ of about 100 mm to about 200 mm, such as about 136 mm to about 170 mm, and, in the case of a 90 mm track pitch, a length $L_{36E}$ of about 57 mm. In some examples, traction portions 30, 36 may share a common length $L_{30E}$, $L_{36E}$, such that every traction portion defines a common height-to-length ratio of about 50:45. Traction portion 36 defines an L-shaped ground contact surface 36D having a width $W_{36D}$ of about 100 mm to about 175 mm, such as about 110 mm to about 160 mm, and a length $L_{36D}$ of about 75 mm to about 125 mm, such as about 100 mm.

As noted above with respect to FIG. 2A, tread pattern 22 may define blocks composed of traction portions having alternating widths. For example, width $W_{30}$ of traction portion 30 may be wider than width $W_{36}$ of traction portion 36.

FIG. 3A is a schematic cross-sectional end view of body 14 of endless track 10 shown in FIGS. 2A and 2B, where the cross-section is taken along line A-A in FIG. 2B. Hence, the view of FIG. 3A looks down longitudinal axis 50 of endless track 10. Cross-sectional view of block 24 is substantially similar to the cross-sectional view of block 28. For example, first lateral traction portion 30 and second lateral traction portion 32 of block 24 may be similar or identical to fifth lateral traction portion 42 and sixth lateral traction portion 44 of block 28, respectively.

In the example of FIG. 3A, first lateral traction portion 30 includes wall 30A extending between common surface 74 and ground contact surface 30D. Also shown in FIG. 3A is protrusion 30C (shown in phantom lines) of first lateral traction portion 30. Second lateral traction portion 32 includes wall 32B extending between common surface 74 and ground contact surface 32D, and protrusion 32C. Each of walls 30A, 32B define a plurality of steps 33 running across the width of the respective wall (e.g., parallel to common surface 74). First lateral traction portion 30 is separated from second lateral traction portion 32 by central channel 70. First lateral traction portion 30 and second lateral traction portion 32 may both define a common height 80 extending between common surface 74 and ground contact surfaces 30D, 32D, respectively.

FIG. 3B is a schematic cross-sectional end view of body 14 of endless track 10 shown in FIGS. 2A and 2B, where the cross-section is taken along line B-B in FIG. 2B. Hence, the view of FIG. 3B looks down longitudinal axis 50 of endless track 10. Cross-sectional view of block 26 is substantially similar to the cross-sectional view of block 29. For example, third lateral traction portion 36 and fourth lateral traction portion 38 of block 26 may be similar or identical to seventh lateral traction portion 43 and eighth lateral traction portion 45 of block 29, respectively. In some examples, walls 30A and 32B collectively extend the entire width of track 10, e.g., the outermost edges of the walls align with the outermost edges of track 10.

In the example of FIG. 3B, third lateral traction portion 36 includes wall 36A, ground contact surface 36D, and protrusion 36C (shown in phantom lines). Fourth lateral traction portion 38 includes wall 38B, ground contact surface 38D, and protrusion 38C. In some examples, walls 36A and 38B do not extend the entire width of track 10, unlike walls 30A and 32B (FIG. 3A). The resulting tread pattern 22 may consist of alternating blocks of wider treads 24, 28, and narrower treads 26, 29.

Each of walls 36A, 38B define a plurality of steps 33 running across the length of the respective wall (e.g., parallel to common surface 74). Third lateral traction portion 36 is separated from fourth lateral traction portion 38 by central channel 70. Third lateral traction portion 36 and fourth lateral traction portion 38 may both define a common height 80 extending between common surface 74 and ground contact surfaces 36D, 38D, respectively.

FIGS. 4A and 4B are example schematic cross-sectional side views of body 14 of endless track 10 shown in FIGS. 2A and 2B, where the cross-section is taken along line C-C in FIG. 2B. Line C-C is substantially perpendicular to lines A-A and B-B in FIG. 2B. Specifically, FIGS. 4A and 4B illustrate example cross-sectional views taken within lateral traction portion 44 of third block 28. As shown in FIG. 4A, each lateral traction portion includes two tapered walls 44A and 44B extending between common surface 74 and ground contact surface 44D of lateral traction portion 44. Walls 44A, 44B taper towards each other, such that traction portion 44 narrows in length in a direction away from common surface 74.

Each wall 44A, 44B defines a plurality of steps 33. Each step 33 defines a rise 76 and a run 78. In some examples, each of steps 33 may be evenly spaced along the length of the respective wall, such that each rise 76 has the same height. For example, each rise 76 may have a height of about 10 mm to about 15 mm (e.g., 10 mm to 15 mm, but for manufacturing tolerances), such as about 13 mm, and each run 78 may have a depth of about 4 mm to about 6 mm, such as about 5.2 mm. In other examples, steps 33 may be unevenly spaced such that at least two different rises 76 define different heights. In addition, in some examples, walls 44A, 44B may define similar spacing of steps 33 or may define different step spacings from each other.

In some examples, such as the example shown in FIG. 4B, runs 78 of steps 33 may be substantially parallel with common surface 74 of second side 14B of track 10, similar to typical walking steps. In other examples, such as the example depicted in FIG. 4A, runs 78 of steps 33 may be angled with respect to the second side of track 10. For example, each of steps 33 may be oriented at an acute angle, such as an angle of about 30 degrees to about 60 degrees, such as an angle of about 55 degrees (e.g., 55 degrees plus or minus 2 degrees), with respect to the second side 14B of track 10. As shown in FIG. 4A, in some examples, steps 33 may be substantially curvilinear, in that the corners where rises 76 meet runs 78 define rounded edges rather than sharp corners or angles. In other examples, as shown in FIG. 4B, steps 33 may define straight or rigid edges, such that each rise 76 and run 78 meet at a defined angle or corner.

While tread pattern 22 is described with reference to an endless track, in other examples, other types of vehicle tracks, such as tires, can include tread pattern 22.

Various examples of the disclosure have been described. These and other examples are within the scope of the following claims.

What is claimed is:

1. A vehicle track comprising:
   a first side configured to mount to a drive system of a vehicle; and
   a second side opposite the first side and defining a tread pattern comprising:
      a first block comprising:
         a first lateral portion; and
         a second lateral portion laterally offset from the first lateral portion,
      wherein the first and second lateral portions are longitudinally aligned; and
      a second block longitudinally offset from the first block, the second block comprising:
         a third lateral portion substantially laterally aligned with the first lateral portion, wherein the second lateral portion and the third lateral portion overlap in a longitudinal direction; and
         a fourth lateral portion substantially laterally aligned with the second lateral portion, wherein the third and fourth lateral portions are longitudinally aligned,
      wherein the first, second, third, and fourth lateral portions are substantially L-shaped, wherein each of the first, second, third, and fourth lateral portions defines at least two walls extending from a common surface of the second side of the track, and wherein each of the at least two walls defines a plurality of steps.

2. The track of claim 1, wherein the first lateral portion and the second lateral portion are longitudinally aligned with one another at a first point along a circumferential axis, and wherein the third lateral portion and the fourth lateral portion are longitudinally aligned with one another at a second point along the circumferential axis.

3. The track of claim 1, wherein each of the first, second, third, and fourth lateral portions comprises a protrusion extending substantially longitudinally away from a transverse axis, and wherein the protrusion of the second lateral portion and the protrusion of the third lateral portion overlap or align in the longitudinal direction along a circumferential axis.

4. The track of claim 1, further comprising a central channel extending in a circumferential direction between the first and second lateral portions and between the third and fourth lateral portions.

5. The track of claim 1, wherein at least some of the steps of at least one of the walls define curvilinear edges.

6. The track of claim 1, wherein at least some of the steps of at least one of the walls define straight edges.

7. The track of claim 1, wherein each of the at least two walls defines three steps.

8. The track of claim 1, wherein the steps are evenly spaced along their respective wall.

9. The track of claim 1, wherein the steps are unevenly spaced along their respective wall.

10. The track of claim 1, wherein a ground contact surface of each step is disposed at an acute angle relative to the common surface of the second side of the track.

11. The track of claim 1, wherein the first and second lateral portions each extend a greater lateral distance from a central circumferential axis of the track than the third and fourth lateral portions extend from the central circumferential axis.

12. The track of claim 1, wherein the walls of each lateral portion are tapered toward each other in a direction toward a ground contact surface.

13. The track of claim 1, wherein the first and second lateral portions each have a height-to-width ratio of about 50:45.

14. The track of claim 1, wherein the first and second lateral portions have substantially similar shapes, wherein the second lateral portion is oriented at about 180 degrees relative to the first lateral portion.

15. The track of claim 1, wherein each of the first, second, third, and fourth lateral portions extends a height of between 54 millimeters and 56 millimeters from the common surface of the second side of the track.

16. The track of claim 1, wherein each of the walls faces in a generally circumferential direction around the second side of the track.

17. A system comprising:
a drive sprocket; and
an endless track coupled to the drive sprocket and defining a tread pattern comprising:
  a first block comprising:
    a first lateral portion; and
    a second lateral portion laterally offset from the first lateral portion,
  wherein the first and second lateral portions are longitudinally aligned; and
  a second block longitudinally offset from the first block, the second block comprising:
    a third lateral portion substantially laterally aligned with the first lateral portion, wherein the second lateral portion and the third lateral portion overlap in a longitudinal direction; and
    a fourth lateral portion substantially laterally aligned with the second lateral portion, wherein the third and fourth lateral portions are longitudinally aligned, wherein the first, second, third, and fourth lateral portions are substantially L-shaped, wherein each of the first, second, third, and fourth lateral portions defines at least two walls extending from a common surface of the endless track, and wherein each of the at least two walls defines a plurality of steps.

18. The system of claim 17, wherein each of the first, second, third, and fourth lateral portions comprises a protrusion extending substantially longitudinally away from a transverse axis, and wherein the protrusions of the second lateral portion and the third lateral portion overlap or align in the longitudinal direction along a circumferential axis.

19. The system of claim 17, wherein at least some of the steps of at least one of the walls define curvilinear edges.

20. The system of claim 17, wherein each of the at least two walls defines three steps.

21. The system of claim 17, wherein each of the first, second, third, and fourth lateral portions extends a height of between 54 millimeters and 56 millimeters from the common surface of the endless track.

22. The system of claim 17, wherein the first and second lateral portions each extend a greater lateral distance from a central circumferential axis than the third and fourth lateral portions extend from the central circumferential axis.

23. A vehicle track comprising:
a first side configured to mount to a drive system of a vehicle; and
a second side opposite the first side and defining a tread pattern comprising:
  a first block comprising:
    a first lateral portion; and
    a second lateral portion laterally offset from the first lateral portion,
  wherein the first and second lateral portions each define a ground contact surface that defines a generally L shape; and
  a second block longitudinally offset from the first block, the second block comprising:
    a third lateral portion substantially laterally aligned with the first lateral portion, wherein the second lateral portion and the third lateral portion in a longitudinal direction; and
    a fourth lateral portion substantially laterally aligned with the second lateral portion, wherein the third and fourth lateral portions each define a ground contact surface that defines a generally L shape, wherein each of the first, second, third, and fourth lateral portions defines at least two walls extending from a common surface of the second side of the track, and wherein each of the at least two walls defines a plurality of steps.

* * * * *